United States Patent [19]

Lefebvre et al.

[11] 4,166,776
[45] Sep. 4, 1979

[54] METHOD FOR THE PREPARATION OF A PISTON MADE OF ALUMINUM ALLOY WITH ITS SURFACE TREATED SO AS NOT TO SEIZE ON CONTACT WITH A CYLINDER WITH AN INTERNAL WALL MADE OF ALUMINUM ALLOY

[75] Inventors: Jacques Lefebvre, Voiron; Jean-Louis Mazodier, Maisons Laffitte, both of France

[73] Assignee: Societe de Vente de l'Aluminium Pechiney, Paris, France

[21] Appl. No.: 846,786

[22] Filed: Oct. 31, 1977

[30] Foreign Application Priority Data

Nov. 5, 1976 [FR] France ................................ 76 34062

[51] Int. Cl.² ...................... C25D 11/08; C25D 11/20
[52] U.S. Cl. ........................................ 204/25; 204/42
[58] Field of Search .............................. 204/25, 23, 42

[56] References Cited
U.S. PATENT DOCUMENTS 3,098,804  7/1963  Wittrock ................................. 204/42
3,099,609  7/1963  Katayose ............................... 204/42
3,493,474  2/1970  Weber ..................................... 204/33
3,943,039  3/1976  Wittrock ................................ 204/42

FOREIGN PATENT DOCUMENTS 440608  1/1936  United Kingdom ...................... 204/42
958487  5/1964  United Kingdom ...................... 204/42
134091  of 1960  U.S.S.R. .

OTHER PUBLICATIONS

Chemical Abstracts vol. 59, No. 3, 1963, Khudyakov (column 2392).
Moderne Galvanotecknik, 1954, W. Machu, pp. 509–517.

Primary Examiner—T. M. Tufariello
Attorney, Agent, or Firm—McDougall, Hersh & Scott

[57] ABSTRACT

A piston made of aluminum alloy with its surface treated by anodization in a phosphoric medium, onto which a layer of an anti-friction metal is deposited by electrolysis, so that the piston does not seize on contact with a cylinder with its internal wall made of aluminum alloy.

8 Claims, No Drawings

METHOD FOR THE PREPARATION OF A PISTON MADE OF ALUMINUM ALLOY WITH ITS SURFACE TREATED SO AS NOT TO SEIZE ON CONTACT WITH A CYLINDER WITH AN INTERNAL WALL MADE OF ALUMINUM ALLOY

The invention relates to a piston of aluminum alloy operative within a cylinder having an internal wall of aluminum alloy in which the piston is previously anodized before receiving an electrolytic metal deposit, which gives it a low coefficient of friction and reduces its tendency to seize.

In the automotive industry, the improvements which are being sought, with a view to reducing fuel consumption, include reducing the weight of the materials used for making vehicles. Weight reduction is obtained either by modifying the structure of the vehicles so as to have identical or improved mechanical properties with reduced weight, or by using materials of lower density.

In particular, as far as the engine is concerned, there is a growing tendency to make the cylinder blocks or pistons of aluminum alloys instead of the conventional cast iron.

However, the conversion has created difficulties in the level of friction between the two interacting components. It was soon observed that aluminum surfaces do not retain the lubricant like cast iron and that, by the action of the temperatures and pressure conditions existing inside the cylinders, the components of the alloys forming the pistons and the internal walls of the cylinders tend to become physically or chemically bonded, leading to seizure detrimental to the good operation and care of the equipment. Manufacturers, not wishing to lose the indisputable advantage of using these ultra light aluminum alloy materials, have sought to avoid the difficulty in various ways. Some of the methods tried had to do with the cylinder block itself and comprised either incorporating cast iron sleeves or linings, or using hypersiliconized aluminum alloys and giving them special surface treatments, e.g. that advocated by Reynolds in their U.S. Pat. No. 3,333,579 which comprised putting the silicon crystals into relief to reduce the coefficient of friction. Other methods had to do with the actual piston and led to the deposition of a coating of a metal not liable to form bonds with the sleeve with which it came into contact during operation: this is the case of the iron coating method of General Motors as described in their French Pat. No. 1,470,250.

At present, however, there are still very few manufacturers who have converted to the all-aluminum method for the unit comprising the engine block, sleeve and piston, because of the expense: it involves large investments and raises very trickly technical problems. With a view to helping to resolve this problem, applicants have made a piston based on aluminum coated by a process which is similar and more advantageous than that described in General Motors patent, and which has quite a remarkable performance in the presence of a sleeve of aluminum alloy treated by the Reynolds method.

According to the aforementioned General Motors patent, before the aluminum piston receives the electrolytic iron deposit, it has to be pickled with a nitric-hydrofluoric mixture in a preliminary stage, then rinsed, covered with zinc by immersion, rinsed again, treated to electrolytically apply a copper plate, rinsed with hydrochloric acid, and finally immersed in an electrolytic iron-coating bath, all these operations being necessary to give the iron layer good adhesion.

The present invention is characterized in that the working surface of the aluminum alloy piston is treated by anodization before receiving the electrolytic deposit of anti-friction metal.

The first feature of the invention is thus the anodizing treatment of the piston. This method, which is well known in the art, follows the machining of the piston and elimination of the machining oils with the usual solvents or degreasing baths; it comprises immersing the piston in an electrolytic solution based on phosphoric acid and subjecting it to the action of an alternating current for a very short time. Solutions containing 50 to 300 g/l and preferably 100 g per liter of $PO_4H_3$ are generally used; the temperature of the solution is from 20° to 70° C. and is preferably fixed at about 50° C. The time of treatment depends on the current density applied, although preferred conditions are 30 seconds at 10 $A/dm^2$ when the temperature of the bath is 50° C.

The second feature of the invention is that the piston thus treated is subjected directly to a galvanoplastic bath so that it receives an electrolytic deposit of metal having an anti-friction action relative to the aluminum alloys forming the inner walls of the cylinders.

In contrast to the aforementioned patented method, applicants have found that it is not necessary to interpose intermediate layers of metal such as zinc and copper before depositing the anti-friction metal; the anodization treatment does in fact permit the formation of a keying layer which is effective to give sufficient appropriate adhesion.

The electrolytic bath used is of known composition and preferably enables iron, nickel, cobalt and chromium to be deposited, although the method of the invention can obviously be extended to other metal deposits or alloys which have good properties of hardness and resistance to seizing and wear.

The aluminum alloy used to make the piston is a well known type:

A-S 12UN containing

Si:11.5 to 13%
Cu:0.5 to 1.5%
Ni:0.5 to 1.5%
Mg:0.8 to 1.52%, although any other types, which are compatible with the properties required for this type of equipment, may be treated according to the invention, e.g.:

A-S IOUG composed of:

Si:9.4 to 10.6%
Cu:1.9 to 2.6%
Mg:0.8 to 1.5%

A-S 18UNG composed of:

Si:17 to 19%
Cu:0.8 to 1.5%
Mg:0.8 to 1.3%
Ni:≦1.3% and A-S 22UNK composed of:

Si:20 to 22%
Cu:1 to 2.2%
Mg:0.8 to 1.3%
Ni:0.8 to 1.6%
C0:0.8 to 1.6%

Two types of treatment according to the invention, to which pistons of the above composition are subjected, will now be given by way of example.

EXAMPLE 1

The following operations are carried out on the piston:
- degreasing: 5 minutes at 60° C. +pickling in an aqueous alkaline bath: 5 minutes at 50° C.,
- immersion in an aqueous bath containing 50% of $NHO_3$ and 5% of HF
- electrolytic treatment for 30 seconds in a bath containing 100 g/l of phosphoric acid in solution in water at 50° C. by the action of alternating current at a current density of 10 $A/dm^2$
- electrolytic coating with iron in an aqueous bath containing:
  465 g/l of ferrous chloride
  38 g/l of boric acid.

The pH of the bath is 0.4, the temperature is 70° C. and the operation is continued for 15 minutes at 8$A/dm^2$.

When the articles have been rinsed they are coated with triethanolamine to prevent the iron deposit from oxidizing in air.

EXAMPLE 2

An identical piston is treated as follows:
- degreasing: 5 minutes as above
- alkaline pickling: 5 minutes as above
- neutralization in $HNO_3$ 50% and HF 5% as above
- electrolytic treatment under the same conditions as in the previous example: 30 seconds at 10 $A/dm^2$ with alternating current in the aqueous bath containing 100 g/l of $H_3PO_4$ at 50° C.
- electrolytic depositing of nickel in an aqueous bath containing:
  180 g/l of nickel sulphate
  25 g/l of ammonium chloride
  30 g/l of boric acid.

The pH of the bath is 5.7; its temperature is 50° C. and the deposit is made for 30 minutes at 4 $A/dm^2$.

The friction tests carried out with articles coated according to the invention show the effectiveness of the process used.

The tests are carried out on a machine in which three are two discs 10 mm thick. One simulates the sleeve of the cylinder and is 35 mm in diameter while the other, in which the wall parallel with its axis is covered with the anti-friction metal, is 65 mm in diameter and simulates the piston.

The two discs are placed in one and the same vertical plane—the straight line which joins the trace of their axes being a vertical direction of that plane—and turn about their axes one against the other, so as to create a pure sliding action between them. Oil is introduced at constant temperature at the level of contact of the two discs. The contact temperature and friction couple can be measured in the coarse of the test by applying a known load to the top part of the upper disc.

The seizure test follows a running-in-period, during which the two discs are placed in contact with one another under a relatively small load and rotate at constant speed. It comprises periodically increasing the load until a seizing effect appears. In the course of the test, this essentilly takes the form of an abrupt increase in the temperature of contact and de-stabilization of the coefficient of friction.

The load which is being applied when seizing takes plate is the seizing load.

The disc used to simulate the sleeve in the test is made of alloy A-51614 having the following composition:
Silicon:16 to 18%
Copper:4.2 to 4.9%
Iron:up to 1%
Magnesium:0.45 to 0.65%
Titanium:0.08 to 0.2%
Manganese:0.1% maximum
Aluminum:the remainder,
the lateral part of the disc having been subjected to the treatment patented by Reynolds.

A disc coated with iron by the General Motors method disc-coated by the method of the invention with iron according to Example 1 and with nickel according to Example 2 are used successively to simulate the piston.

The results obtained are as follows:

| Disc simulating the sleeve | Disc simulating the piston | Seizing load | Coefficient of friction |
|---|---|---|---|
| AS 17U4 by powder metallurgy in accordance with Reynolds patent | AS 12 UN coated with iron in accordance with General Motors patent. | 80 | Stable 0.040 under 70 daN |
| " | AS 12 UN coated with iron in accordance with Example 1 of invention | 180 | Stable 0.031 under 70 daN 0.024 under 130 daN |
| " | AS 12 UN coated with nickel in accordance with Example 2 of invention | 170 | Stable 0.026 under 70 daN 0.023 under 130 daN |

These results clearly show the advantage, in respect of friction properties, provided by the treatment according to the invention as compared with prior art treatment.

A very substantial improvement is noted in the seizing load, which can be doubled, as well as a very marked decrease in the coefficient of friction and consequently better resistance to wear.

These technical advantages are obtained in addition to the very important economic advantage which results from the simplification of the manufacturing operations.

The deposition of zinc, then of copper, are finally iron with the intermediate rinsing treatments are in fact replaced by two main operations, namely, the preparatory anodizing treatment, then the depositing of the selective metal.

This dual advantage provided by the invention makes it possible for the resultant equipment to have its field of application extended to all types of cylinder blocks made of aluminum alloys, whether or not they have aluminum sleeves and whether or not they are treated by the Reynolds or any other method.

We claim:

1. A method for the preparation of a piston of aluminum alloy having a high silicon content of 9.4% by weight and above for operation within a cylinder in which surfaces engaged by the piston are of an aluminum alloy comprising flash coating an oxide layer onto the surfaces of the piston which operatively engages the cylinder by anodic oxidation with an alternating current in an aqueous phosphoric acid bath containing 50–300 g/l of phosphoric acid at a temperature within the range of 20°–70° C. for a very short period of time and then applying a thin coating onto the oxidized surfaces of a metal selected from the group consisting of iron, nickel, cobalt and chromium.

2. A method as claimed in claim 1 in which the metal is deposited on the oxide surfaces by electrolytic deposition.

3. A method as claimed in claim 1 in which the anodization is carried out with a current density of 10 A/dm$^2$.

4. A method as claimed in claim 1 in which the aluminum alloy is composed of 11.5 to 13% by weight silicon, 0.5 to 1.5% by weight copper, 0.5 to 1.5% by weight nickel, 0.8 to 1.5% by weight magnesium, and the remainder aluminum plus impurities.

5. A method as claimed in claim 1 in which the aluminum alloy is composed of 9.4 to 10.6% by weight silicon, 1.9 to 2.6% by weight copper, 0.8 to 1.5% by weight magnesium, with the remainder aluminum plus impurities.

6. A method as claimed in claim 1 in which the aluminum alloy is composed of 17 to 19% by weight silicon, 0.8 to 1.5% by weight copper, 0.8 to 1.3% by weight magnesium, less than 1.3% by weight nickel, with the remainder aluminum plus impurities.

7. A method as claimed in claim 1 in which the aluminum alloy is composed of 20 to 22% by weight silicon, 1 to 2.2% by weight copper, 0.8 to 1.3% by weight magnesium, 0.8 to 1.6% by weight nickel, 0.8 to 1.6% by weight cobalt, with the remainder aluminum plus impurities.

8. A method as claimed in claim 1 in which the anodic oxidation is carried out for about 30 seconds.

* * * * *

UNITED STATES PATENT OFFICE
CERTIFICATE OF CORRECTION

Patent No. 4,166,776  Dated September 4, 1979

Inventor(s) Jacques Lefebre and Jean-Louis Mazodier

It is certified that error appears in the above-identified patent and that said Letters Patent are hereby corrected as shown below:

Col. 3, line 11, cancel "$NHO_3$" and substitute -- $HNO_3$ --

Signed and Sealed this

Fourth Day of December 1979

[SEAL]

Attest:

SIDNEY A. DIAMOND

Attesting Officer

Commissioner of Patents and Trademarks